(12) United States Patent
Skoglund et al.

(10) Patent No.: US 7,125,438 B2
(45) Date of Patent: Oct. 24, 2006

(54) METHOD AND AN APPARATUS FOR CONTINUOUSLY DEAERATING A LIQUID

(75) Inventors: Tomas Skoglund, Lund (SE); Christer Lanzingh, Lomma (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 207 days.

(21) Appl. No.: 10/381,854

(22) PCT Filed: Sep. 26, 2001

(86) PCT No.: PCT/SE01/02071

§ 371 (c)(1),
(2), (4) Date: Sep. 11, 2003

(87) PCT Pub. No.: WO02/26346

PCT Pub. Date: Apr. 4, 2002

(65) Prior Publication Data

US 2004/0050253 A1    Mar. 18, 2004

(30) Foreign Application Priority Data

Sep. 29, 2000    (SE) .................................. 0003505

(51) Int. Cl.
*B01D 19/00*    (2006.01)
(52) U.S. Cl. .............................. 95/263; 95/266; 95/246; 96/193; 96/202; 426/66; 426/475; 426/487
(58) Field of Classification Search .................. 95/263, 95/246, 265, 264, 266, 243, 245, 259, 247, 95/248; 96/193, 202; 426/66, 487, 475, 426/476; 261/122.1
See application file for complete search history.

(56) References Cited

U.S. PATENT DOCUMENTS

| 598,037 | A | * | 1/1898 | Wainwright | ................. 266/209 |
|---|---|---|---|---|---|
| 1,527,586 | A | * | 2/1925 | Hunziker | ..................... 426/586 |
| 4,136,747 | A | * | 1/1979 | Mallory et al. | ................ 175/66 |
| 4,352,679 | A | * | 10/1982 | Notardonato et al. | ......... 95/245 |
| 4,385,909 | A | * | 5/1983 | Starr | ........................... 95/266 |
| 4,943,305 | A | | 7/1990 | Bernhardt | |
| 4,950,394 | A | | 8/1990 | Bernhardt et al. | |

(Continued)

FOREIGN PATENT DOCUMENTS

DE    3143459 A1    5/1983

*Primary Examiner*—Duane Smith
*Assistant Examiner*—Douglas J Theisen
(74) *Attorney, Agent, or Firm*—Buchanan Ingersoll & Rooney PC

(57) ABSTRACT

The invention relates to a method for continuously deaerating a liquid. The method comprises the step that the liquid is led into a closed container (1) so that a liquid surface (7) is formed within the container (1). The space above the liquid surface (7) is under vacuum. The method further includes the step that a gas is led into the liquid at a level below the liquid surface (7). The invention also relates to an apparatus which comprises a closed container (1). The container (1) has an inlet (5) for the liquid which is to be deaerated, as well as an outlet (6) for the liquid which has been deaerated, both placed in the lower region of the container (1). The container (1) further has a connection (13) to a vacuum pump (14) placed in the upper region of the container (1), as well as an inlet (15) for a gas placed in the lower region of the container (1).

7 Claims, 2 Drawing Sheets

U.S. PATENT DOCUMENTS 5,014,727 A * 5/1991 Aigo ........................ 134/102.2
5,122,166 A * 6/1992 Hyrcyk et al. ................. 95/141
5,310,417 A * 5/1994 Bekedam ...................... 96/157
5,352,276 A 10/1994 Rentschler et al.

* cited by examiner

METHOD AND AN APPARATUS FOR CONTINUOUSLY DEAERATING A LIQUID

FIELD OF THE INVENTION

The present invention relates to a method for continuously deaerating, or purging, a liquid which is led into a closed container so that a liquid surface is formed within the container.

The present invention also relates to an apparatus for continuously deaerating a liquid, comprising a closed container, with an inlet and an outlet for the liquid located in the lower region of the container.

BACKGROUND OF THE INVENTION

All liquids contain more or less air in free, dispersed or dissolved form. Within the industry which employs process water, there is often a need to remove this air. Above all within the food industry, this is often necessary, since a content of air may result in the deterioration of the quality of the product, or alternatively hamper those processes that are being employed.

For example, in the production of fruit juices or beverages containing fruit juices, it is particularly important, since oxygen oxidizes the product and destroys the important vitamin C. Too large a content of air is also a disadvantage as regards the production of carbonated drinks, since it makes it more difficult to add carbon dioxide. Milk-based products are also deaerated, since a large content of air results in a deterioration in quality and disrupts the process in that scorching of the product, so-called fouling in heat treatment plants increases with an increased air content. An excessively large air content may also cause frothing in certain processes, which is difficult to handle.

There are a number of methods and apparatuses employed in the art for removing air from liquids. A common method entails that the liquid, at a certain temperature, is distributed in a vacuum vessel. The pressure in the vessel is kept at such a level that a certain degree of boiling occurs, so-called flash. The alternative to flash is that the vacuum vessel is filled with a packing material through which the liquid is caused to pass, but without the occurrence of boiling. This method may be speeded up by introducing, under partial vacuum, a gas such as carbon dioxide into the liquid, and by such means drive out and replace the air with the gas. This method is often entitled stripping and is particularly suitable for liquids which are later to be carbonated.

The methods in existence today often function satisfactorily but entail that there is a need to invest in special equipment. In certain cases, such equipment may also be extremely bulky.

SUMMARY OF THE INVENTION

One object of the present invention is to realise a method for continuously deaerating a liquid which is simple and economical and which gives an efficient deaeration.

A further object of the present invention is that the apparatus for carrying the method into effect is economical and may rapidly be integrated or retrofitted into a process line without taking up a large amount of space.

These and other objects have been attained according to the present invention in that the method of the type disclosed by way of introduction has been given the characterising features that the space above the liquid surface is under vacuum, and that a gas introduced into the liquid at a level below the liquid surface.

These and other objects have also been attained according to the present invention in that the apparatus of the type disclosed by way of introduction has been given the characterising feature that the container, in its upper region, has a connection to a vacuum pump, and that the container has, in its lower region, an inlet for a gas.

Preferred embodiments of the present invention have further been given the characterising features as set forth in the appended subclaims.

BRIEF DESCRIPTION OF THE DRAWINGS

One preferred embodiment of the present invention will now be described in greater detail hereinbelow, with reference to the accompanying Drawings, in which.

DETAILED DESCRIPTION OF THE INVENTION

Figure 1:
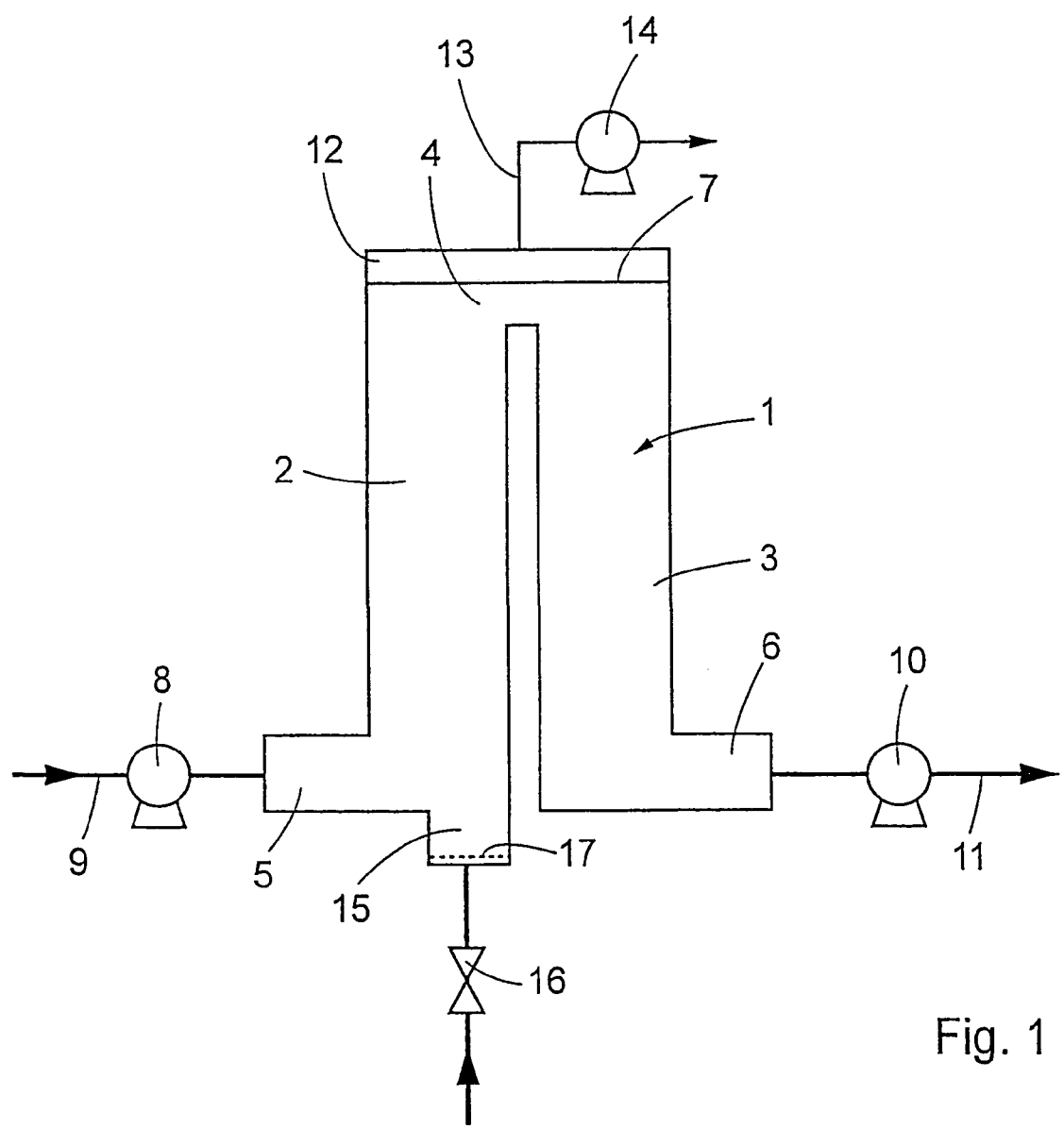
FIG. 1 is a schematic illustration of an apparatus according to a first embodiment of the present invention.

The apparatus, as shown in FIG. 1, comprises a closed container 1. In this first preferred embodiment, the container 1 is in the form of an inverted U with two shanks 2, 3. The shanks 2 and 3 are united by a common web portion 4. The common web portion 4 constitutes the upper region of the container 1.

In the lower region of the container 1, placed in the one shank 2, there is an inlet 5 for the liquid to be deaerated. In the second shank 3, in the lower region of the container 1, there is provided an outlet 6 for the liquid which has been deaerated. The liquid passes through the container 1 in such a manner that a liquid surface 7 is formed in the common web portion 4 in the upper region of the container 1. In order to facilitate the passage of the liquid through the container 1, a pressurising pump 8 may be placed in a conduit 9 upstream of the inlet 5 to the container 1. This pump 8 is, however, not necessary for carrying the method into effect. In order to move the deaerated liquid which departs from the container 1 further, a pressurising pump 10 may be placed in a conduit 11 downstream of the outlet 6 from the container 1.

The container 1 may very simply be manufactured from pipes and pipe bends. The inlet 5 and the outlet 6 are connected to the container 1 by means of conical pipe lengths (not shown). By employing this simple design of the container, no costly vacuum vessels are necessary for carrying the method into effect. Nor will the container 1 in this embodiment be particularly bulky and it may readily be integrated or retrofitted into an existing conduit.

In that a liquid surface 7 is formed in the upper region of the container 1, there will be created a space 12. This space 12 is connected by the intermediary of a conduit 13 to a vacuum pump 14. The vacuum pump 14 creates low pressure, or alternatively a vacuum (0–0.2 bar) in the space 12 above the liquid surface 7.

In addition to an inlet for liquid which is to be deaerated, the one shank 2 also has an inlet 15 for a gas. The inlet 15 for gas is provided with some form of throttle valve 16. Further, in direct association with the gas inlet 15, there is a bubble-generating device 17. The device 17 may consist of an extremely fine-meshed net or a metal plate in which extremely small holes are provided. Alternatively, the device 17 consists of a diaphragm- or a microfilter.

Figure 2:
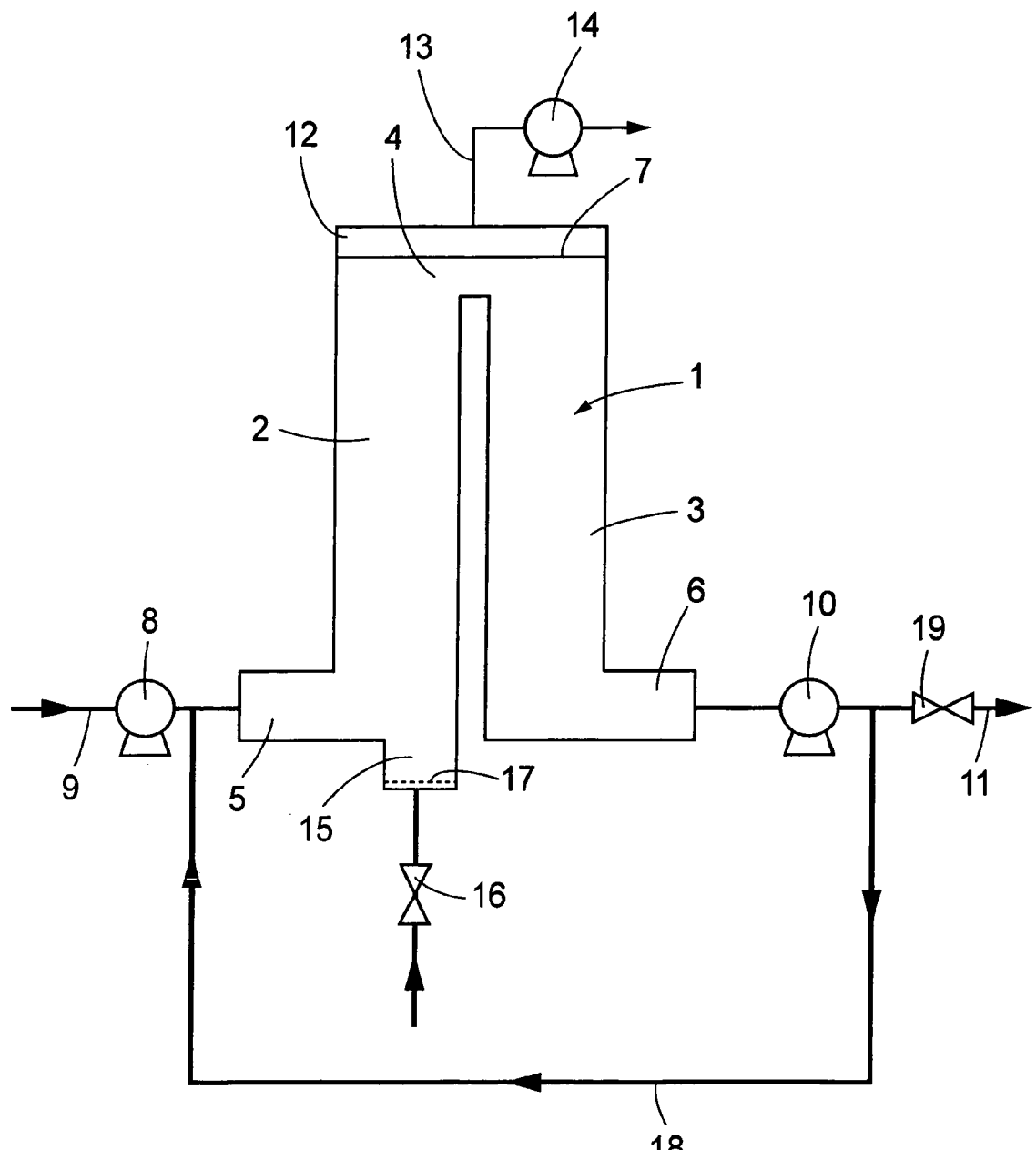
FIG. 2 is a schematic illustration of an apparatus according to a second embodiment of the present invention.

The second preferred embodiment is shown in FIG. 2. The apparatus comprises the closed container 1 in the form of an inverted U with two shanks 2, 3. The shanks 2 and 3 are united by the common web portion 4 constituting the upper region of the container 1.

In the lower region of the container 1, placed in the one shank 2, there is an inlet 5 for the liquid to be deaerated. In the second shank 3, in the lower region of the container 1, there is provided an outlet 6 for the liquid which has been deaerated. The liquid passes through the container 1 in such a manner that a liquid surface 7 is formed in the common web portion 4 in the upper region of the container 1. In order to facilitate the passage of the liquid through the container 1, a pressurising pump 8 may be placed in the conduit 9 upstream of the inlet 5 to the container 1. This pump 8 is, however, not necessary for carrying the method into effect.

In order to move the deaerated liquid which departs from the container 1 further, a pressurising pump 10 is to be placed in the conduit 11 downstream of the outlet 6 from the container 1. Between the outlet 6 and the inlet 5 in the container there is a circulation pipe 18, arranged so that the pressurising pump is used to circulate the liquid over the container 1. The conduit 11 is also to contain some sort of throttle valve 19 located downstream of the circulation pipe 18.

As in the first embodiment of the invention, in this second embodiment, the container 1 may very simply be manufactured from pipes and pipe bends. The inlet 5 and the outlet 6 are connected to the container 1 by means of conical pipe lengths (not shown). By employing this simple design of the container, no costly vacuum vessels are necessary for carrying the method into effect. Nor will the container 1 in this embodiment be particularly bulky and it may readily be integrated or retrofitted into an existing conduit.

In that a liquid surface 7 is formed in the upper region of the container 1, there will be created a space 12. This space 12 is connected by the intermediary of a conduit 13 to a vacuum pump 14. The vacuum pump 14 creates low pressure, or alternatively a vacuum (0–0.2 bar) in the space 12 above the liquid surface 7.

In addition to an inlet for liquid which is to be deaerated, the one shank 2 also has an inlet 15 for a gas. The inlet 15 for gas is provided with some form of throttle valve 16. Further, in direct association with the gas inlet 15, there is a bubble-generating device 17. The device 17 may consist of an extremely fine-meshed net or a metal plate in which extremely small holes are provided. Alternatively, the device 17 consists of a diaphragm- or a microfilter.

The liquid which is to be deaerated preferably consists of water which may thereafter be diluted with juice concentrate or the like, depending upon what process the water is to be employed for. Other liquids such as fruit juices, fruit drinks or milk, may also be deaerated employing this method.

The gas which is employed in the method according to the present invention preferably consists of air at atmospheric pressure. Since the deaeration is intended for food products, the air should be of very high quality and must, if necessary be cleaned before being employed in the method. Alternatively, other gases such as nitrogen gas or carbon dioxide may also be employed. If the liquid is, later in the process, to be carbonated, carbon dioxide may be employed as the gas, but if not, use is suitably made of air, nitrogen or other suitable gas.

The method is carried into effect in that the liquid which is to be deaerated is led into the closed container 1. At the same time as the liquid enters into the container 1, a gas flows into the container 1 through the bubble-generating device 17. The bubble-generating device 17 divides the gas into a large number of extremely small bubbles. The small bubbles form "cores" for the air which is in the liquid in free, dispersed or dissolved form. The "cores" grow to larger air bubbles which, when they are sufficiently large, move up towards the liquid surface 7. The air leaves the liquid and the container 1 through the conduit 13.

No great pressure need be applied on the liquid which is entering the container 1. However, the pressure should be higher than the pressure prevailing above the liquid surface 7. The pressure above the liquid surface 7 lies at vacuum or very close to vacuum. Nor does the gas which is fed into the container 1 need to be pressurised. However, the pressure within the container 1 should be lower in order to make it possible for the gas to enter into the container 1.

According to the first embodiment of the invention the deaerated liquid is leaving the container 1 via the outlet 6 and is transported further along the conduit 11, possibly helped with the pressurising pump 10.

According to the second embodiment of the invention, the liquid leaving the container 1 at the outlet 6 is circulated over the circulation pipe 18, back to the inlet 5 of the container 1. In order to improve the deaeration of the liquid, the liquid is circulated 3 to 5 times over the container 1, before it is transported further along the conduit 11. The container 1 with the inlet 5, the outlet 6, the circulation pipe 18, the pressurising pump 10 and the throttle valve 19 thereby constitute a feed and bleed arrangement.

The above-described method and the apparatus for carrying the method into effect make for an efficient deaeration which meets those requirements placed by the processing industry for the production of drinks and the like. For example, for juice production, an oxygen content applies of 1 ppm or lower.

As will have been apparent from the foregoing description, the present invention realises a method for continuously deaerating a liquid which is efficient and economical to carry out, since air may be employed as the gas which constitutes the "cores" in the method. The apparatus for carrying the method into effect is also simple and economical to manufacture and it may readily be integrated or retrofitted into an existing plant.

What is claimed is:

1. A method of continuously deaerating a liquid to remove gas from the liquid, comprising leading the liquid into a closed container so that a liquid surface is formed within the container, introducing gas into the liquid at a level below the liquid surface, and creating a vacuum in a space above the liquid surface to draw off the gas that has been removed from the liquid, and wherein the gas that is introduced into the liquid at a level below the liquid surface and the gas that is removed from the liquid and drawn off are the same, and the gas introduced into the liquid at a level below the liquid surface is air.

2. The method as claimed in claim 1, wherein the air introduced into the liquid at a level below the liquid surface is air at atmospheric pressure.

3. The method as claimed in claim 1, wherein the air introduced into the liquid at a level below the liquid surface passes a bubble-generating device upon inflow of the air to the liquid.

4. The method as claimed in claim 3, wherein the bubble-generating device divides the air into a large number of small bubbles which constitute "cores" for the air which the liquid contains.

5. The method as claimed in claim 1, wherein the liquid is circulated over the container.

6. The method as claimed in claim 5, wherein the liquid is circulated 3 to 5 times.

7. An apparatus for continuously deaerating a liquid, comprising a closed container, with an inlet and an outlet for the liquid, located in the lower region of the container, wherein the container has, in its upper region, a connection to a vacuum pump and wherein the container has, in its lower region, an inlet for a gas, wherein the container is in the form of an inverted U with the inlet for the liquid in a first shank and the outlet for the liquid in a second shank, and wherein the inlet for the gas is placed close to the inlet for the liquid.

\* \* \* \* \*